United States Patent

[11] 3,631,947

| [72] | Inventor | James Morrison Laing<br>Letchworth, England |
|---|---|---|
| [21] | Appl. No. | 45,747 |
| [22] | Filed | June 12, 1970 |
| [45] | Patented | Jan. 4, 1972 |
| [73] | Assignee | Borg-Warner Limited<br>Letchworth, England |
| [32] | Priority | July 10, 1969 |
| [33] | | Great Britain |
| [31] | | 34,900/69 |

[54] TORQUE-TRANSMITTING CONNECTION AND METHOD OF MAKING THE SAME
10 Claims, 6 Drawing Figs.

[52] U.S. Cl. ..................................................... 192/4 A,
 74/449, 74/764
[51] Int. Cl. ....................................................... F16d 41/24,
 F16h 55/12, F16h 57/10
[50] Field of Search ........................................... 74/449,
 411.5, 764; 192/4 A

[56] References Cited
UNITED STATES PATENTS

| 2,729,110 | 1/1956 | Killian et al. .................. | 74/449 X |
| 3,354,536 | 11/1967 | Younger ....................... | 74/449 X |

*Primary Examiner*—Leonard H. Gerin
*Attorney*—Robert L. Zeig

ABSTRACT: A torque-transmitting connection and method of manufacture thereof, e.g. for an automatic transmission, in which first and second annular sheet metal cup-shaped members are formed by a combined sheet metal drawing and shearing operation, so that axially extending portions of each member have axial toothlike indentations formed therein. The indentations or the two members interengage to provide a torque-transmitting connection. One of the cup-shaped members may be provided with circumferentially spaced apertures in the axially extending portion, to receive a parking pawl to lock the transmission.

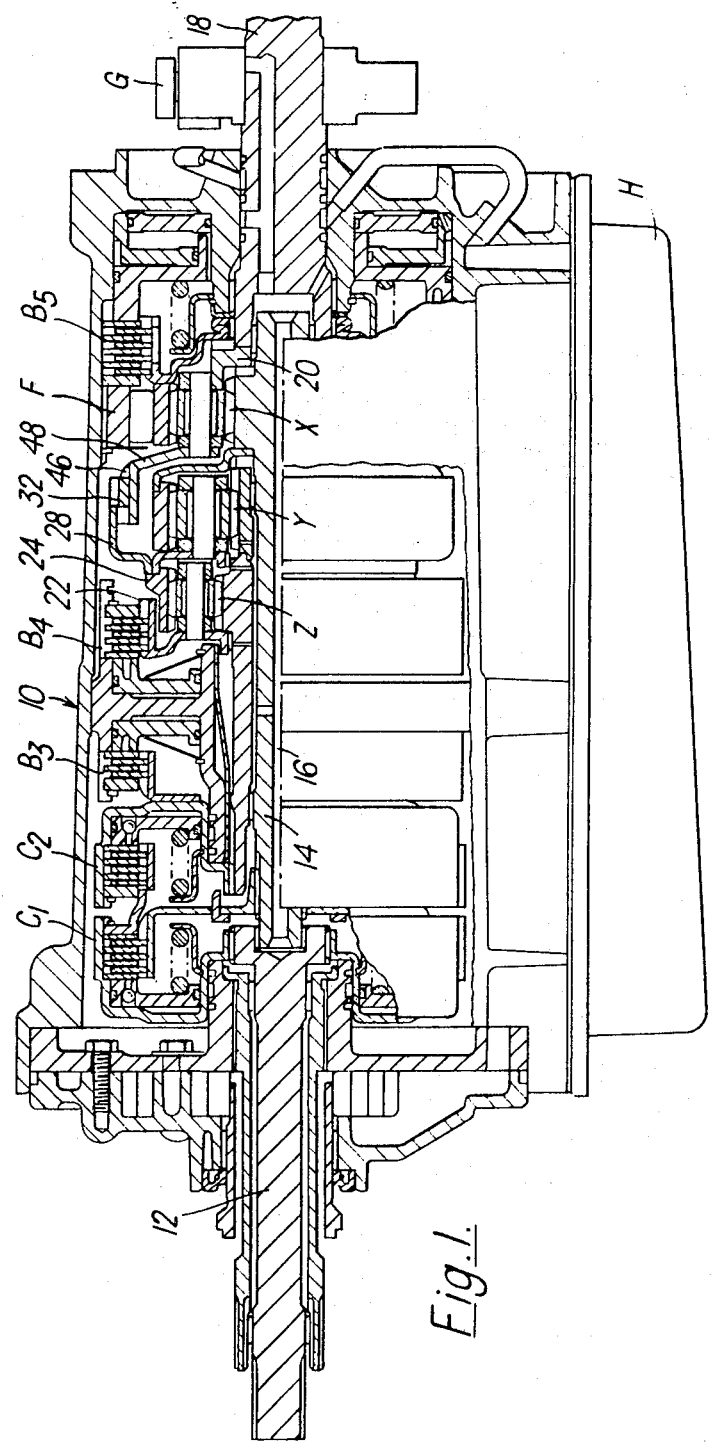

INVENTOR
JAMES M. LAING

BY Robert L. Zieg
ATTORNEY

INVENTOR
JAMES M. LAING
BY Robert L. Zieg
ATTORNEY

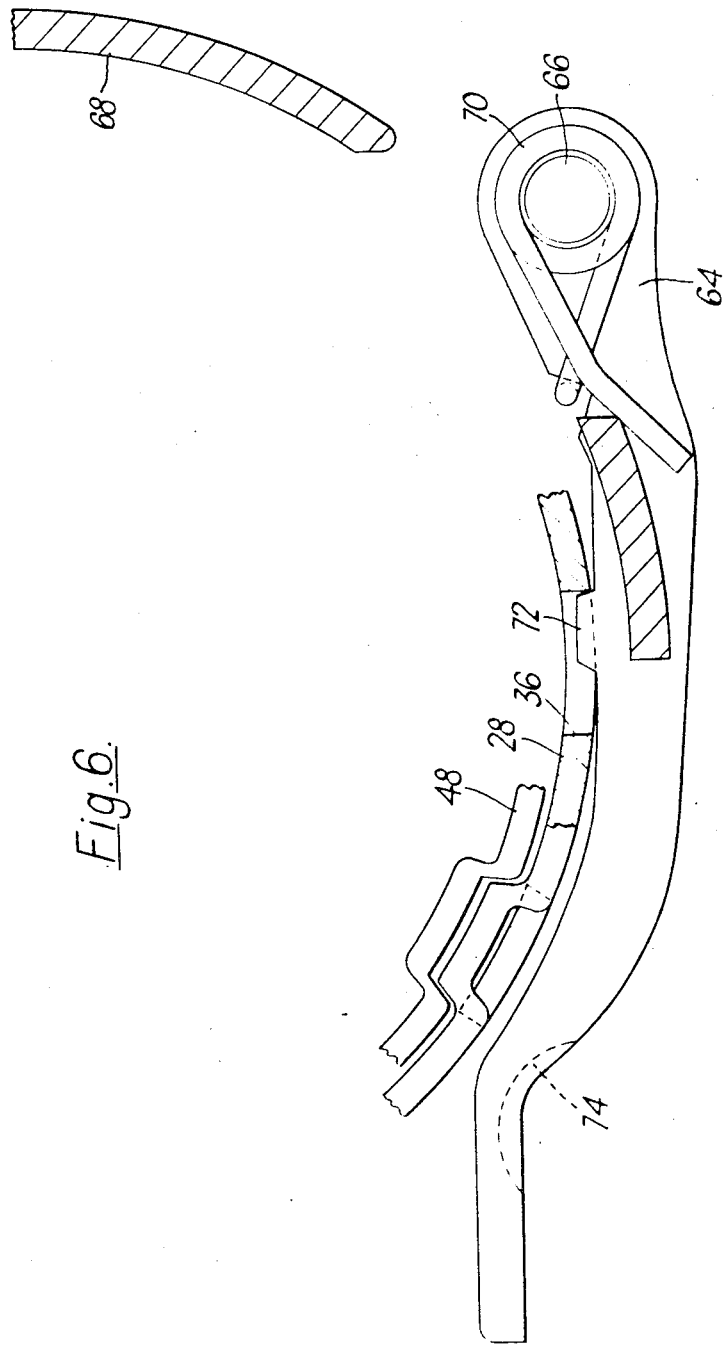

TORQUE-TRANSMITTING CONNECTION AND METHOD OF MAKING THE SAME

The present invention relates to a torque-transmitting connection and a method of making such a connection.

Conventionally, a torque-transmitting connection between two rotatable parts is effected by using a key on one member and a keyway on the other, or by using cooperating splines on the two members. The use of cooperating splines is preferred since it provides a more positive connection which is less likely to fail. The splines are usually produced by conventional machining or broaching, which may be effected on a precast or forged blank. Hence the production of a splined connection can, from a manufacturing point of view, give rise to considerable expense.

It is an object of the present invention to overcome this difficulty.

According to the present invention, there is provided a method of making a torque-transmitting connection between first and second annular sheet metal parts each having an axially extending portion comprising the steps of:

a. forming a series of axially extending toothlike indentations in said axially extending portion of said first part;
b. forming a series of toothlike indentations in said axially extending portion of said second part; and
c. assembling said parts together, said indentations one each being interengaged to make a splinelike torque-transmitting connection. Preferably the toothlike indentations on the second part have a tooth depth greater than the thickness of the sheet metal.

With the method of the invention, a robust construction may be provided at considerably less expense than with a conventional method of making a torque-transmitting connection. The toothlike indentations are preferably produced by a combined sheet metal drawing and shearing operation. The shearing of the sheet metal permits the tooth depth of the indentations to be greater than the thickness of the metal.

The method of the present invention is particularly applicable to the construction of a transmission mechanism such as is utilized in an automatic gearbox. Thus, according to a further aspect of the invention, there is provided a transmission mechanism including axially displaced first and second gear elements, a first sheet metal part connected to one of said gear elements having an axially extending portion thereon having a series of toothlike indentations formed therein, a second sheet metal part connected to the other of said gear element and having an axially extending portion thereon having a series of axially extending toothlike indentations formed therein for interengagement with the first indentation to form a torque-transmitting connection between said gear elements through the medium of said sheet metal parts.

With such a construction, a series of apertures may be formed in one of the sheet metal parts around the circumference thereof, these apertures being adapted to be engaged by a stationary element and thereby act as a parking brake for the transmission mechanism.

In order that the invention may more readily be understood, the following description is given, merely by way of example, reference being made to the accompanying drawings, in which:

FIG. 1 is a schematic cross section through one embodiment of automatic transmission incorporating the connection of the present invention;

FIG. 6 is a schematic enlarged cross-sectional view of the parking pawl assembly utilized in the transmission of FIG. 1.

Figure 3:
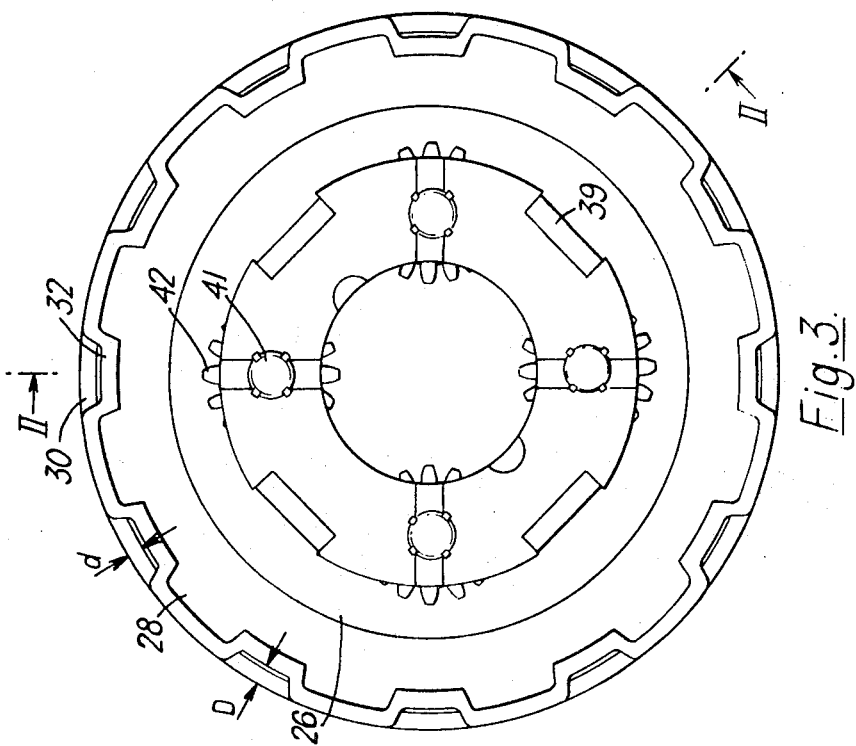
FIG. 3 is an end view of the assembly of FIG. 2.

Referring first to FIG. 1, there is illustrated one embodiment of transmission 10 according to the invention. This comprises an input shaft 12, and first and second clutches C1 and C2. The output drum of the first clutch C1 drives the sun gear of an epicyclic gearset X by means of a shaft 14. The output of the second clutch C2 drives a shaft 16, which in turn drives the sun gear of an epicyclic gearset Y and that of a further epicyclic gearset Z. Shaft 16 is a hollow shaft concentric and coaxial with shaft 14, the shaft 14 being partly disposed within shaft 16.

The output shaft 18 of the transmission is welded to a planet carrier 20 of the gearset X. The brake B3 is arranged selectively to lock the output drum of the second clutch C2, and thus to lock the sun gear of the gearsets Y and Z. The second brake B4, when engaged, locks the planet carrier 22 of the gearset Z. The annulus of the gearset X is connected by a one-way or spray clutch F to the transmission case. A third brake B5 is also connected to annulus of gearset X. Mounted on the output shaft 18 is a governor G which controls in cooperation with a valve assembly, indicated by the general reference numeral H, the operation of the various clutches and brakes. Details of the operation do not form part of the present invention, and it is believed that further details of this and of the construction of the various brakes and clutches is not necessary in this specification.

Figure 2:
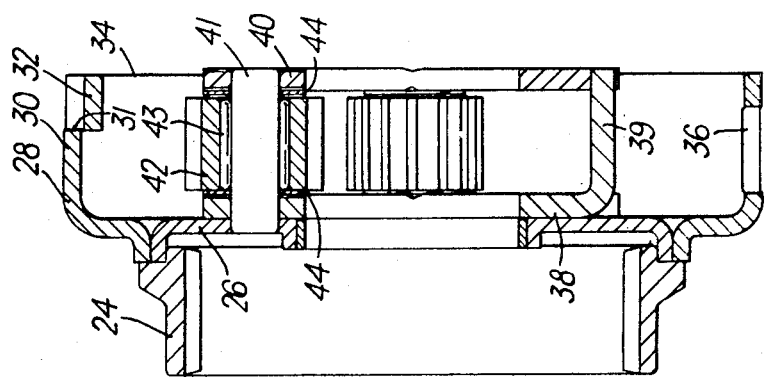
FIG. 2 is a cross section on the line II—II of FIG. 3 of the middle planetary carrier assembly utilized in the transmission of FIG. 1.

Referring now to FIG. 2, there is illustrated the ring gear or annulus 24 of the gearset Z. This component is also shown in FIG. 1. Secured, for example by welding, to the annulus 24 is a sheet metal planet carrier 26 for the gearset Y. Also secured, for example by welding, to the annulus 24 is an annular sheet metal cup-shaped member 28, having an axially extending portion 30 formed with axially extending indentations 32. These extend from the free edge 34 of the member 28 axially inwardly a distance which is only a part of the total axial length of the axially extending portion 30. Formed between the indentations and extending in that portion which is not formed with indentations are a plurality of openings or apertures 36.

Indentations 32 are formed by a combined shearing and drawing process such that a shearing takes place forming the edge 31 at the inner terminus of the indentations 32. Due to the shearing the tooth depth shown as "D" in FIG. 3 may be greater than the metal thickness "d." The greater tooth depth thus obtained provides for transmission of larger torques than would be possible with lesser tooth depths.

The planet carrier 26 has welded thereto a sheet metal spacer member 38 which has axially extending tangs 39 formed thereon. These tangs have welded thereto a support plate 40, the support plate spacer member 38 and planet carrier 26 being formed with four apertures, each of which receives the shaft 41 for one of the planet gears 42. The shaft 41 is locked in position by staking or deforming the spacer member 40 and the carrier 26 adjacent each shaft 41, in a manner which need not be discussed in detail in this specification. Rotation of the pinions 42 is ensured by needle bearings 43 and by bearing discs 44 located between the pinions and the spacer member 38 and the support plate 40.

Figure 4:
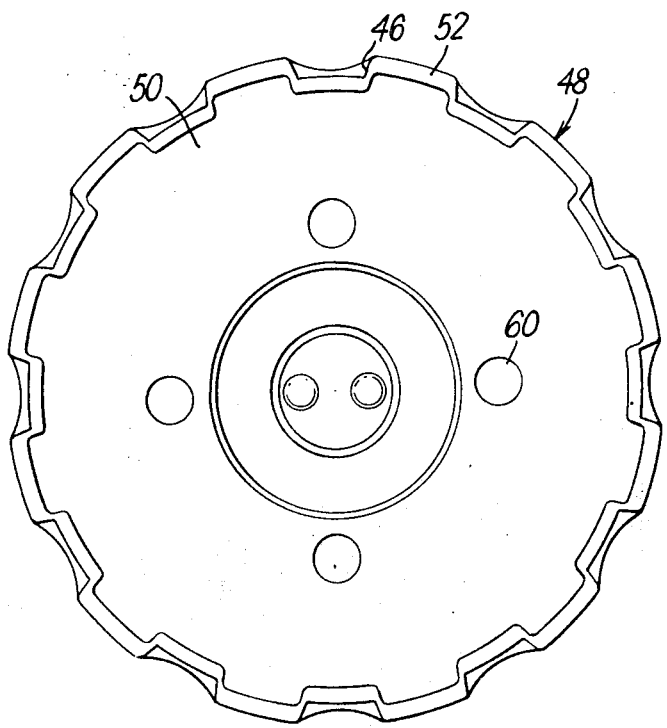
FIG. 4 is an end view of the second annular sheet metal member of the connection utilized in the construction of FIG. 1.
Figure 5:
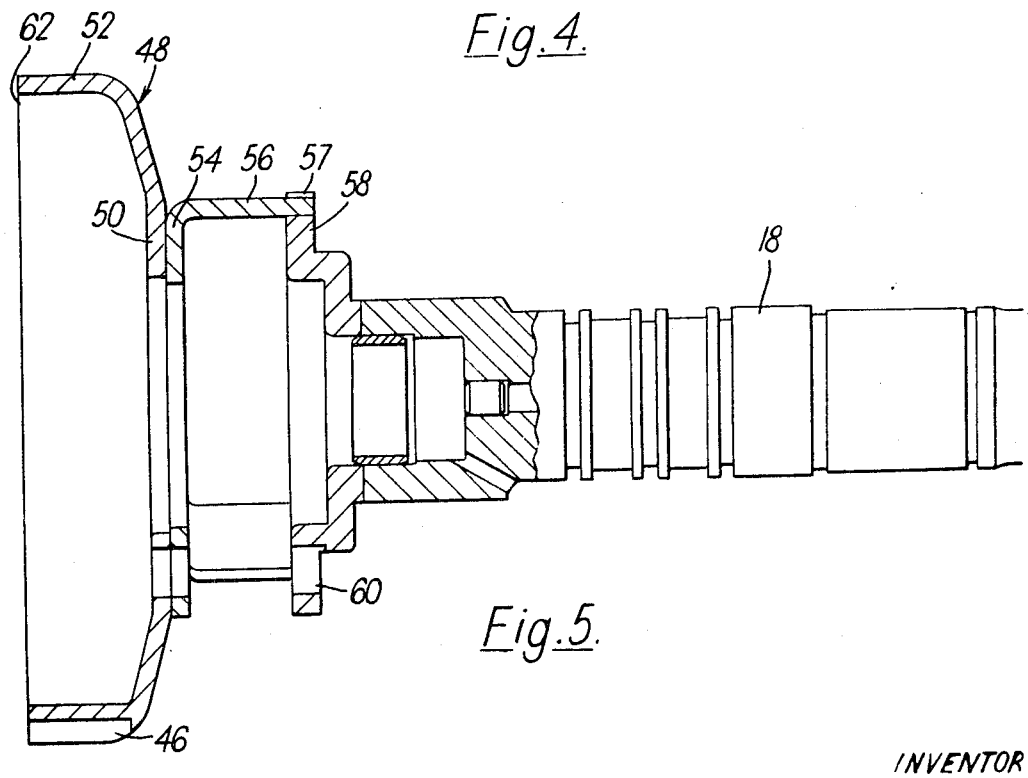
FIG. 5 is a section through the member of FIG. 4, showing its connection to the output shaft of the transmission.

Referring again to FIG. 1, it can be seen that the indentations 32 on the member 28 cooperate to provide a torque-transmitting connection, with similar indentations 46 on a further cup-shaped annular sheet metal member 48. Further details of this member 48 will be apparent from FIGS. 4 and 5, from which it can be seen that the member 48 has a radially extending portion 50 and an axially extending portion 52 on which the indentations 46 are formed.

The indentations 32 in the member 26, and the indentations 46 in the member 48 are both capable of being formed by a combined drawing and shearing operation on a sheet metal blank.

Secured, for example by welding, to the radial wall 50 is a spacer member 54, having spaced-apart axially extending tangs 56 formed thereon, these tangs engaging in peripheral slots 57 formed in the periphery of a disc 58, which in turn is secured, for example by electron beam welding, to the output shaft 18. Corresponding axial holes 60 are formed in the disc 58, the spacer 56, and the radial wall 50 to accommodate the shafts of corresponding pinion gears which are assembled in a similar manner to the pinion gears 42 of the gearset Y. These pinion gears form the planet gears of the gearset X.

It will be appreciated that the free edge 62 of the annular member 48 is located entirely within the axially extending wall of the sheet metal member 28, with the two sheet metal annular members 28, 48 being in face-to-face relationship. The cooperation of the splinelike indentations 32 and 46 ensures a torque-transmitting connection between the members 28 and 48.

As indicated previously, the member 28 is provided with a series of circumferentially spaced openings or apertures 36. Referring now to FIG. 6 of the drawings, there is illustrated the parking pawl assembly of the transmission. This comprises a lever 64, which is pivoted on a pin 66, mounted on the casing 68 of the transmission. The arm 64 is urged in a generally counterclockwise direction, as illustrated in FIG. 6, by means of a coil torsion spring 70, for example. On its upper surface, the arm 64 is provided with a pawl 72, the size of which is about half that of the diameter of the apertures 36 in the member 28. Near its free end, the arm 64 is provided with a cam surface 74, which engages a tapered camming member (not shown), which is linked to the manual selector lever of the transmission. Thus, when the park condition of the transmission is selected, the camming member (not shown) engages the cam surface 74 and rotates the arm 64 in a clockwise direction, as viewed in FIG. 6, about the pivot 66 against the action of the spring 70, so that the pawl 72 is engaged in one of the apertures 36. This has the effect of locking the member 28, and therefore the member 48, so that the output shaft 18 of the transmission is also locked.

With regard to the operating conditions of the transmission, the following table indicates which clutches and brakes have to engage to achieve the various ratios.

|  | C1 | C2 | B3 | B4 | B5 | F |
| --- | --- | --- | --- | --- | --- | --- |
| First gear | X |  |  |  |  | X |
| Second gear | X |  |  | X |  |  |
| Third gear | X |  | X |  |  |  |
| Fourth gear | X | X |  |  |  |  |
| Reverse |  | X |  |  | X |  |

I claim:

1. A transmission mechanism including axially displaced first and second gear elements, a first annular sheet metal part connected to one of said gear elements having an axially extending portion thereon having a series of axially extending toothlike indentations formed therein, a second annular sheet metal part connected to the other of said gear elements and having an axially extending portion thereon having a series of axially extending toothlike indentations formed therein for interengagement with the first said indentations to form a torque-transmitting connection between said gear elements through the medium of said sheet metal parts.

2. A transmission mechanism as claimed in claim 1 wherein a series of apertures is formed in one of said sheet metal parts extending around the circumference thereof adapted to be engaged by a stationary element and thereby act as a parking brake for said transmission mechanism.

3. A transmission mechanism as claimed in claim 2, wherein said axially extending portion has a free end and said axially extending indentations extend in an axial direction inwardly over only a part of said axially extending portion from said free end, and wherein said apertures are formed in the remainder of said axially extending portion and between said indentations.

4. A transmission mechanism as claimed in claim 2, wherein said gear elements and said annular sheet metal parts are mounted for rotation within a casing and wherein said stationary element comprises a parking pawl formed on an arm pivoted to said casing.

5. A transmission mechanism as claimed in claim 1 including a plurality of planetary gearsets, said first and second gear elements each being a member of one of said gearsets, and said torque-transmitting connection being arranged to transfer torque between said gearsets.

6. A transmission mechanism as claimed in claim 5 including an output shaft and wherein one of said gear elements is connected to said output shaft.

7. A transmission mechanism as claimed in claim 6, wherein said first annular sheet metal part comprises the planet gear carrier of one of said planetary gearsets and wherein said first annular sheet part is connected to said output shaft.

8. A transmission mechanism as claimed in claim 7, and further comprising a disc secured to said output shaft and provided with peripheral slots and a sheet metal intermediate member secured to said second annular sheet metal part, and axially extending tangs on said sheet metal intermediate member engaged in said peripheral slots.

9. A transmission mechanism as claimed in claim 1, wherein said first and second annular sheet metal parts are cup-shaped members each having an axially extending portion terminating in a free end, and wherein the cup-shaped members are assembled in face-to-face relation with the free end of one cup-shaped member within the other cup-shaped member.

10. A transmission mechanism including axially displaced first and second gear elements, a first annular sheet metal part connected to one of said gear elements and a second annular sheet metal part connected to the other of said gear elements, means interconnecting said first and second annular sheet metal parts to provide a torque-transmitting connection, and a series of apertures in one of said sheet metal parts extending around the circumference thereof adapted to be engaged by a stationary element and thereby to act as a parking brake for said transmission mechanism.

* * * * *